(12) United States Patent
Kanno

(10) Patent No.: US 7,933,671 B2
(45) Date of Patent: Apr. 26, 2011

(54) DATA OUTPUTTING DEVICE, DATA OUTPUTTING METHOD, DATA OUTPUTTING PROGRAM, AND RECORDING MEDIUM

(75) Inventor: Atsushi Kanno, Tenri (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1129 days.

(21) Appl. No.: 11/656,483

(22) Filed: Jan. 23, 2007

(65) Prior Publication Data

US 2007/0183753 A1 Aug. 9, 2007

(30) Foreign Application Priority Data

Jan. 24, 2006 (JP) ................................. 2006-015076

(51) Int. Cl.
*G06F 17/00* (2006.01)
*H04B 3/00* (2006.01)
*H04B 5/00* (2006.01)

(52) U.S. Cl. ............................... 700/94; 381/77; 381/79

(58) Field of Classification Search .................... 700/94; 340/825.25, 825.28, 825.29; 455/41.3, 517, 455/526, 66.1, 418, 456.3; 382/305; 381/79–81, 381/77; 707/104.1

See application file for complete search history.

(56) References Cited

U.S. PATENT DOCUMENTS

| 5,510,901 | A | 4/1996 | Takahashi et al. | |
|---|---|---|---|---|
| 7,669,131 | B2 * | 2/2010 | Matsuyama | ................... 715/730 |
| 2004/0100487 | A1 | 5/2004 | Mori et al. | |
| 2004/0126102 | A1 | 7/2004 | Oikawa | |
| 2005/0016364 | A1 | 1/2005 | Kamiya | |
| 2006/0056796 | A1 | 3/2006 | Nishizawa et al. | |
| 2006/0177153 | A1 * | 8/2006 | King et al. | ................... 382/305 |

FOREIGN PATENT DOCUMENTS

| EP | 1 422 668 A2 | 5/2004 |
|---|---|---|
| EP | 1 667 154 A1 | 6/2006 |
| JP | 62-34356 A | 2/1987 |
| JP | 2002-185928 A | 6/2002 |
| JP | 2004-95100 A | 3/2004 |
| JP | 2005-44409 A | 2/2005 |
| JP | 2005-184617 A | 7/2005 |

\* cited by examiner

*Primary Examiner* — Andrew C. Flanders
*Assistant Examiner* — Jesse A Elbin
(74) *Attorney, Agent, or Firm* — Birch, Stewart, Kolasch & Birch, LLP

(57) ABSTRACT

An electronic data outputting section switches output electronic data from one electronic data to another electronic data. Upon the switching, a sameness judging section judges whether or not audio data associated with the electronic data that is currently being outputted and audio data associated with the new electronic data that is to be outputted are identical to each other. When the sameness judging section judges that they are identical to each other, the audio data outputting section keeps on outputting the audio data that is currently being outputted. This prevents such unnatural audio playback that a sound supposed to be continuously played back is temporarily stopped and then is played back again upon the switching of the content playback.

11 Claims, 11 Drawing Sheets

DATA OUTPUTTING DEVICE, DATA OUTPUTTING METHOD, DATA OUTPUTTING PROGRAM, AND RECORDING MEDIUM

This Nonprovisional application claims priority under 35 U.S.C. §119(a) on Patent Application No. 2006/015076 filed in Japan on Jan. 24, 2006, the entire contents of which are hereby incorporated by reference.

FIELD OF THE INVENTION

The present invention relates to a data outputting device for outputting content data, a data outputting method, a data outputting program, and a recording medium.

BACKGROUND OF THE INVENTION

As accompanied with rapid development of various types of recording medium, information amount that can be generally handled has been dramatically increased. In the past, music, games, and the like used to be commercially available via a magnetic tape, a floppy Disk®, or a ROM (Read Only Memory), each of which stores several-megabyte information. In the present time, recording mediums such as a CD-R (Compact Disc Recordable) and a DVD (Digital Video Disc) each having a large storage volume allow for distribution of a wide variety of information.

Such a large storage volume in each of the recording mediums makes it technically possible to (i) add BGM (Back-Ground Music) to a simple photo album style still image content, or (ii) play back audio data simultaneously with display of an electronic book, an electronic document, a web document, or the like.

Handling of audio data in each of such electronic contents usually depends on a player for playing the content, despite the content creator's intension.

For example, Japanese Unexamined Patent Publication Tokukaisho 62-34356/1987 (published on Feb. 14, 1987) discloses a technique for realizing automatic long-time music playback without any user's operation. In the technique of this Patent citation, music playback continues in accordance with respective data of a plurality of disks by repeating playing back all the disks, until the user makes an instruction to finish the music playback. This makes it possible to keep on outputting the audio data without any user's operation.

Meanwhile, Japanese Unexamined Patent Publication Tokukai 2005-44409 (published on Feb. 17, 2005) discloses a technique for avoiding silence between audio data. In the technique of this Patent citation, when there is found continuity between songs to be played in a row, silence between the songs is eliminated, with the result that the songs are played continuously. This allows the user to enjoy listening with substantially no silence between songs.

Further, Japanese Unexamined Patent Publication Tokukai 2004-95100 (published on Mar. 25, 2004) discloses a technique concerning association between video data and audio data. The technique of this Patent citation promotes efficiency of an authoring operation for actually associating a sound with an image in playing back a video content in which the image and the sound are associated with each other. Further, in the technique, BGM is played back only during a set period of time. This makes it possible to prevent the audio data from being intermittently interrupted due to the video data, which is information changing rapidly.

Each of the Patent citations pays attention to a way of continuously playing back audio data, in order to solve their problems. However, each of the Patent citations does not take into consideration a difference between respective playback times of data, which are associated with each other and which have different data formats. The difference is caused due to the association between the data.

Consider a case of viewing (reading) text-based data such as an electronic document or an electronic book. In this case, speed of reading the text-based data differs depending on a person unlike a case of viewing video data or the like. Therefore, it is impossible to determine one playback time for both the text-based data and audio data associated with the text-based data. This arises two problems: (1) the playback of the audio data possibly ends before finishing reading the text-based data; and (2) the playback of the audio data possibly ends at a point where a creator of the content does not intend the playback to end.

The problem (1) can be avoided by playing back the set audio data again from its beginning. This is attained by a conventional technique. The problem (2) is further classified into two cases: (i) a case where the playback of the audio data stops at a "predictable point"; and (ii) a case where the playback thereof stops at an "unpredictable point".

Consider a case where a scene, a state, or a file is changed at a predictable point in the conventional technique. In this case, the playback of the audio data is interrupted and then another audio is played back, but the end of a section of the content and the stop of the BGM correspond to each other for the user, so that the user does not really feel strange even if, e.g., the song played back after the interruption is the same as the song played back before the interruption.

On the other hand, consider a case where there are "unpredictable" sections in the prepared content file. Examples of the unpredictable sections include groups, files, paragraphs, and the like. These unpredictable sections are unrecognizable while viewing the product content. Now, assume that BGM is set for each of the sections. In this case, the BGM is temporarily stopped being played back and then played back again (hereinafter, also referred to as "stop/playback process") in the aforementioned conventional manner for every section unrecognizable for the user, so that the BGM is interrupted at a point unpredictable for the user and then is played back again. The user feels strange because he/she thinks that the BGM would have been continuously played back.

The following explains this problem more in detail, with reference to FIG. 11. FIG. 11 is an explanatory diagram illustrating such discontinuous BGM playback occurring in the conventional technique. See a portion indicated by a reference numeral 110 in FIG. 11. A display device 112 displays a page image 113 while BGM 115 is played back from a speaker (not shown).

Here, consider a case where the user instructs the display device 112 to switch display pages from the page image 113 to a page image 114. In response to the instruction, the display device switches the display pages from the page image 113 to the page image 114, and the playback of the BGM 115 from the speaker 15 is temporarily stopped. When the page image 114 is displayed by the display device 112, the BGM 115 is played back again. As such, upon switching the display images from the page image 113 to the page image 114, the BGM 115 is played back discontinuously.

As the user views (reads) faster, it takes shorter time for the user to reach each of the unpredictable sections, with the result that the user encounters the unpredictable sections so often. If the stop/playback process is carried out for every section in this case, a period of actually playing back the BGM becomes extremely short. As a result, it is almost impossible to obtain an effect as BGM.

SUMMARY OF THE INVENTION

The present invention is made in view of the foregoing conventional problems, and its object is to provide a data outputting device, a data outputting method, a data outputting program, and a recording medium, each of which prevents such unnatural audio playback that a sound supposed to be continuously played back is temporarily stopped at a content playback switching point which a user cannot recognize (or is not much conscious of) and is played back again.

In order to achieve the object, a data outputting device according to the present invention includes: electronic data outputting means for sending, to a content playback device, electronic data representing a content; audio data outputting means for sending, to an audio playback device, audio data associated with the electronic data and representing a sound; and sameness judging means for judging, when the electronic data outputting means carries out switching from the electronic data to another electronic data different from the electronic data such that the another electronic data is to be sent to the content playback device, whether or not the audio data and another audio data associated with the another electronic data are identical to each other; when the sameness judging means judges that the audio data and the another audio data are identical to each other, the audio data outputting means keeping on sending the audio data to the audio playback device.

According to the above structure, the electronic data outputting means sends the electronic data representing the content, to the content playback device. The wording "content" herein is, e.g., an image or a moving image. Therefore, the electronic data is either image data representing an image or moving image data representing a moving image.

The content playback device plays back the content in accordance with the input electronic data. For example, when receiving image data, the content playback device displays an image on its screen. When receiving moving image data, the content playback device displays a moving image thereon.

The audio data outputting means sends the audio data to the audio playback device. The audio data is associated with the electronic data. Specifically, the audio data is associated with the electronic data such that the audio data is outputted simultaneously and in synchronism with the outputting of the electronic data from the electronic data outputting means.

The audio data represents a sound. The sound is, e.g., BGM or a sound effect, and is supposed to be played back continuously and repeatedly. When the audio playback device receives such audio data, the audio playback device plays back the sound such as BGM.

In the above process, while the data outputting device outputs the electronic data and the audio data, the content playback device plays back the content and the audio playback device plays back the sound, simultaneously. This allows the user to view the content, such as an image or a moving image, via the content playback device and hear the sound associated with the content, simultaneously.

Here, the electronic data outputting means is capable of carrying out switching from the electronic data to the aforesaid another electronic data that is different from the electronic data. The "another electronic data" herein is associated with the another audio data.

When the electronic data outputting means carries out the electronic data outputting switching, the sameness judging means of the data outputting device compares (i) the audio data that the audio data outputting means is currently outputting with (ii) the aforesaid another audio data, so as to judge whether the audio data and the aforesaid another audio data are identical to each other.

In accordance with a result of the judgment carried out by the sameness judging means, the audio data outputting means controls the outputting of the audio data. Specifically, when the sameness judging means judges that the above two audio data are identical to each other, the audio data outputting means keeps on outputting the audio data that is being currently outputted. In this way, the outputting of the audio data is maintained even when the switching of the electronic data outputting is made. Therefore, the audio playback continues even when switching is made from one display image to another image or from one display moving image to another moving image.

This makes it possible to prevent such unnatural audio playback that a sound supposed to be played back continuously is temporarily stopped upon the content playback switching and is played back again. This allows the user to keep on listening to the same sound (e.g., BGM) continuously while the content switching is carried out from one to another. In other words, the data outputting device gives the user a sufficient effect (e.g., mood or sense of presence that the user feels as if he/she were really in a scene presented by the content) allowed by the sound associated with the content.

In order to achieve the object, a data outputting method according to the present invention includes: an electronic data outputting step of sending, to a content playback device, electronic data representing a content; an audio data outputting step of sending, to an audio playback device, audio data associated with the electronic data and representing a sound; a switching step of carrying out switching from the electronic data to another electronic data different from the electronic data such that the another electronic data is to be sent to the content playback device; a sameness judging step of judging whether or not the audio data and the another audio data associated with the another electronic data are identical to each other; and an audio data continuous outputting step of keeping on sending the audio data to the audio playback device when it is judged in the sameness judging step that the audio data and the another audio data are identical to each other.

The above method allows an effect similar to the effect allowed by the above data outputting device.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 9(*b*) is a diagram illustrating that a viewer is listening to a voice explanation while viewing a painting.

DESCRIPTION OF THE EMBODIMENTS

Figure 1:
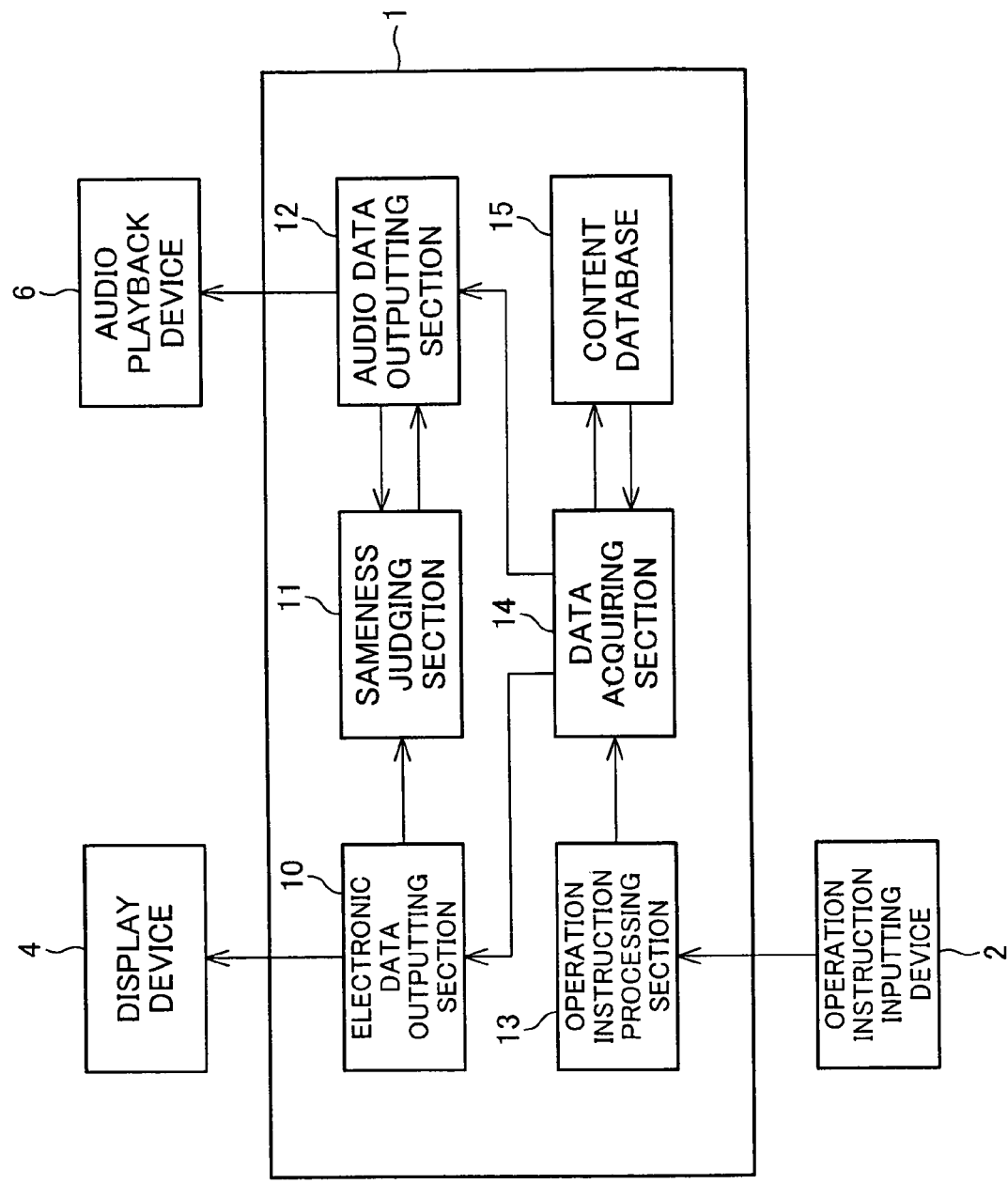
FIG. 1 is a block diagram illustrating a structure of a main part of a data outputting device according to the present invention.

One embodiment of the present invention will be described below with reference to FIG. 1 through FIG. 10. In the explanation below, identical materials and components will be given the same reference symbols. The same holds true for names and functions of the members and the components. Therefore, detained explanations therefor are never repeatedly made.

DEFINITIONS OF TERMS

Firstly explained are definitions of terms used in the present embodiment.

A term "client" refers to someone who or something which makes a request to a data outputting device 1 according to the present embodiment such that the data outputting device 1 carries out a given process. For example, the client is a human being who actually uses the device. Otherwise, the client is an internal/external calculation processing device for transmitting a request for audio playback. Otherwise, the client is a calculation processing program.

A term "recording means" refers to means for recording information. In cases where information to be recorded is search target information, examples of the recording means include: external storage means and recording mediums, such as a main storage device, a HDD (Hard Disk Drive), a CD-ROM (Compact Disk Read Only Memory), and a memory card.

A term "inputting device" refers to a device via which a human being feeds information to a calculation device such as a CPU. Examples of the inputting device include a keyboard, a mouse, a tablet, and the like, but the inputting device is not limited to these.

A term "input information" refers to at least either one of (i) information entered by the client and (ii) information acquired from a recording area of the recording means. Examples of the "information entered by the client" include (i) text information entered via a keyboard, (ii) stroke information entered via a tablet, (iii) text information obtained by subjecting the stroke information to text recognizing processing, and the like. Another examples thereof include (i) a captured image of text written in paper, (ii) information of text recognized from the captured image, and the like. The image is captured by a camera or the like.

A term "display device" refers to a device for displaying and expressing information supplied from the calculation device such as a CPU. That is, examples of the display device include general displays, and a device for providing goods in response to a signal such as a vending machine.

A term "display means" refers to any means that is capable of acquiring and designating a display range. The display means encompasses means for physically specifying where in the device the search target information is secured.

A term "communication device" refers to a gateway device, a router, a dedicated line, or the like. The communication means may be any means provided between outside and a processing device so as to receiving, from outside, information that is not stored in the processing device.

Embodiment 1

With reference to FIG. 1 through FIG. 7, the following explains a case where the data outputting device 1 according to the present invention is used as a data outputting device 1 for (i) sending electronic data, which represents an image or a moving image, to a display device 4 and (ii) sending audio data, which represents a sound, to an audio playback device 6.

(Data Outputting Device 1)

The following explains a structure of the data outputting device 1 according to the present invention, with reference to FIG. 1. FIG. 1 is a block diagram illustrating a structure of a main part of the data outputting device 1 according to the present invention. As shown in FIG. 1, the data outputting device 1 includes: an electronic data outputting section 10 (electronic data outputting means), a sameness judging section 11 (sameness judging means), an audio data outputting section 12 (audio data outputting means), an operation instruction processing section 13, a data acquiring section 14, and a content database 15.

Further, the data outputting device 1 is connected to an operation instruction inputting device 2, a display device 4 (content playback device), and an audio playback device 6. The operation instruction inputting device 2 is an inputting device such as a keyboard or a mouse. A client (user) operates the operation instruction inputting device 2 so as to input, into the data outputting device 1, an instruction for an operation to be carried out by the data outputting device 1. The display device 4 plays back a content represented by electronic data supplied from the data outputting device 1. In other words, the display device 4 displays the content on its screen. The audio playback device 6 plays back a sound represented by audio data supplied from the data outputting device 1.

(Appearances of the Devices)

Figure 2:
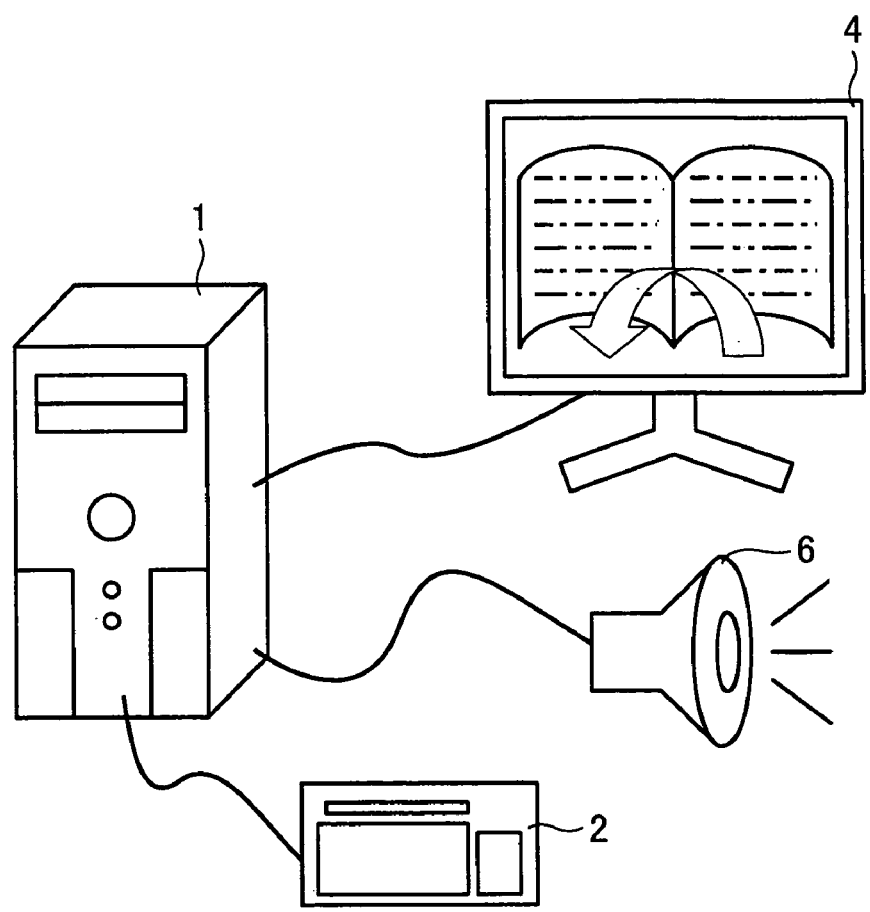
FIG. 2 is an explanatory diagram illustrating respective appearances of the data outputting device, an operation instruction inputting device, a display device, and an audio playback device.

The following explains respective appearances of the data outputting device 1, the operation instruction inputting device 2, the display device 4, and the audio playback device 6, with reference to FIG. 2. FIG. 2 is an explanatory diagram illustrating the respective appearances of the data outputting device 1, the operation instruction inputting device 2, the display device 4, and the audio playback device 6.

As shown in FIG. 2, the data outputting device 1 can be realized as a general personal computer, and the operation instruction outputting device 2 can be realized as a keyboard. The operation instruction inputting device 2 receives an operation instruction from the client, and sends the operation instruction to a CPU, which serves as the operation instruction processing section 13. The operation instruction may not be in a specific form and may be in any form in which an instruction concerning an operation can be described. Further, the display device 4 can be realized as a liquid crystal display or a plasma display. Further, the audio playback device 6 can be realized as a speaker.

In the present embodiment, the data outputting device 1, the operation instruction inputting device 2, the display device 4, and the audio playback device 6 are realized as individual devices separated from one another. However, the present invention is not only realized by these individual devices. For example, the present invention can be realized by either (i) a structure in which the data outputting device 1, the operation instruction inputting device 2, the display device 4, and the audio playback device 6 are provided in one piece; or (ii) a structure in which the data outputting device 1 is combined with one or more of the operation instruction inputting device 2, the display device 4, and the audio playback device 6.

For ease of explanation, this specification assumes that: the phrase "output(s) data, etc", encompasses not only (i) a case where a member A outputs data to a member B; but also (ii) a case where the member B causes the member A to output the data, so as to acquire the data therefrom.

(Display and Playback of Data)

The data outputting device 1 controls a timing at which electronic data and audio data are outputted, in consideration of a case where the same audio data is associated with certain data sections. The following specifically explains this.

Via the operation instruction inputting device 2, the client instructs the data outputting device 1 to play back a content. The operation instruction processing section 13 receives and interprets the instruction so as to analyze what electronic data is required. Then, the operation instruction processing section 13 sends a result of the analysis to the data acquiring section 14. In other words, the operation instruction processing section 13 instructs the data acquiring section 14 to acquire the electronic data and the audio data. In accordance with the instruction, the data acquiring section 14 acquires, from the content database 15, the designated electronic data and the audio data associated with the electronic data.

The data acquiring section 14 sends the acquired electronic data to the electronic data outputting section 10, and sends the acquired audio data to the audio data outputting section 12. The electronic data outputting section 10 receives the electronic data and sends it to the display device 4. Accordingly, the display device 4 plays back the content (e.g., an image or a moving image) represented by the electronic data, i.e., displays the content on its screen.

The audio data outputting section 12 extracts predetermined audio data information from the received audio data. The audio data information is data indicating quantitative information concerning the audio data. The audio data outputting section 12 sends the extracted audio data information to the sameness judging section 11. Here, if no audio data is currently being outputted, the audio data outputting section 12 directly sends the received audio data to the audio playback device 6. In this way, the audio playback device 6 plays back a sound, such as BGM, represented by the received audio data.

(Audio Data Comparison Upon Electronic Data Switching)

The data outputting device 1 is capable of switching output electronic data from one electronic data to another. For such switching, the data outputting device 1 carries out the following processes (1) through (3):

(1) The data acquiring section 14 acquires new electronic data and new audio data associated with the new electronic data.

(2) When the electronic data outputting section 10 switches the output electronic data to the new electronic data, the audio data outputting section 12 sends, to the sameness judging section 11, audio data information concerning the newly acquired audio data.

(3) The sameness judging section 11 compares (i) audio information of the audio data currently being outputted with (ii) the audio data information supplied in the above process (2). When the sameness judging section 11 judges that the two audio data information are identical to each other, it is judged that the two audio data are identical to each other. In accordance with the judgment, the audio data outputting section 12 keeps on outputting the audio data that is currently being outputted.

(One Example of a Structure of the Data Outputting Device 1)

Figure 3:
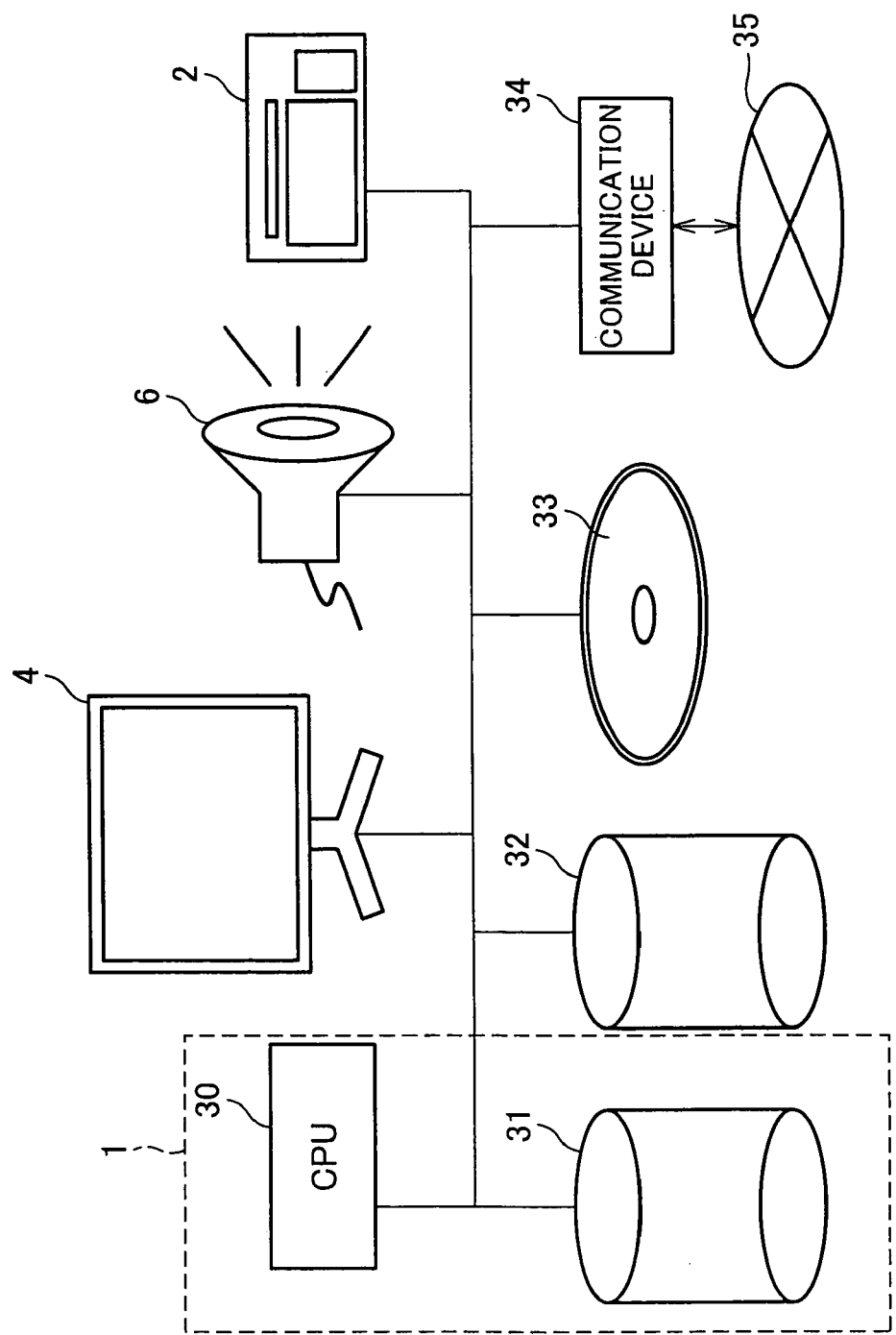
FIG. 3 is a diagram illustrating a system including the data outputting device.

With reference to FIG. 3, the following explains a system including the data outputting device 1. FIG. 3 is a diagram illustrating a structure of the system including the data outputting device 1. As shown in FIG. 3, the data outputting device 1 is made up of a CPU 30 and a main storage device 31.

(CPU 30)

The CPU (central processing unit) 30 functions as the electronic data outputting section 10, the sameness judging section 11, the audio data outputting section 12, the operation instruction processing section 13, and the data acquiring section 14, each of which is shown in FIG. 1. The CPU 30 acquires a program describing procedures of the processes to be carried out by the above members, from the main storage device 31, an external storage device 32, or a network via a communication device 34. Note that data exchange may be carried out using any device that is capable of sending and receiving data. Examples of such a device include a wired communication device and a wireless communication device. Further, instead of the CPU 30, any device may carry out the procedures of the processes to be carried out by the electronic data outputting section 10, the sameness judging section 11, the audio data outputting section 12, the operation instruction processing section 13, and the data acquiring section 14, as long as the device is capable of carrying out the procedures of the processes.

(Main Storage Device 31)

The main storage device 31 is a temporary storage medium such as a flash memory. Mainly, the electronic data outputting section 10, the sameness judging section 11, the audio data outputting section 12, the operation instruction processing section 13, and the data acquiring section 14 cause the main storage device 31 to read the operation procedures thereof, for the purpose of carrying out the information acquisition, the information extraction, and the information analysis. Note that a register region or the like provided in the CPU 30 is one type of the main storage device 31.

(External Storage Device 32)

The external storage device 32 is a removable storage device such as a HDD (hard disk drive). Mainly, the external storage device 32 stores (i) the analysis result determined by the CPU 30, and (ii) save target data that is temporarily unnecessary for the main storage medium 31. Further, a main storage device or an external storage device each connected to the CPU 30 via a network 35 may be used as the external storage device 32. The connection to the CPU 30 via the network 35 is wired connection or wireless connection.

(Information Recording Medium 33)

The information recording medium 33 is an individual recording medium such as a flash memory or a CD-R, and stores the content database 15. Therefore, the data acquiring section 14 make access to the information recording medium 33 and makes connections to the content database 15 so as to acquire the electronic data and the audio data. Note that the content database 15 may be stored in the external storage device 32. In this case, the data acquiring section 14 make access to the external storage device 32 and make connections to the content database 15 so as to acquire the electronic data and the audio data.

(Communication Device 34)

The communication device 34 is connected to the network 35. The connection is wired connection or wireless connection. Via the connection, the communication device 34 exchange data with other network device. Further, the communication device 34 allows the data acquiring section 14 of the data outputting device 1 to acquire electronic data and audio data from the network 35.

(Display of Electronic Book and Playback of BGM)

Figure 4:
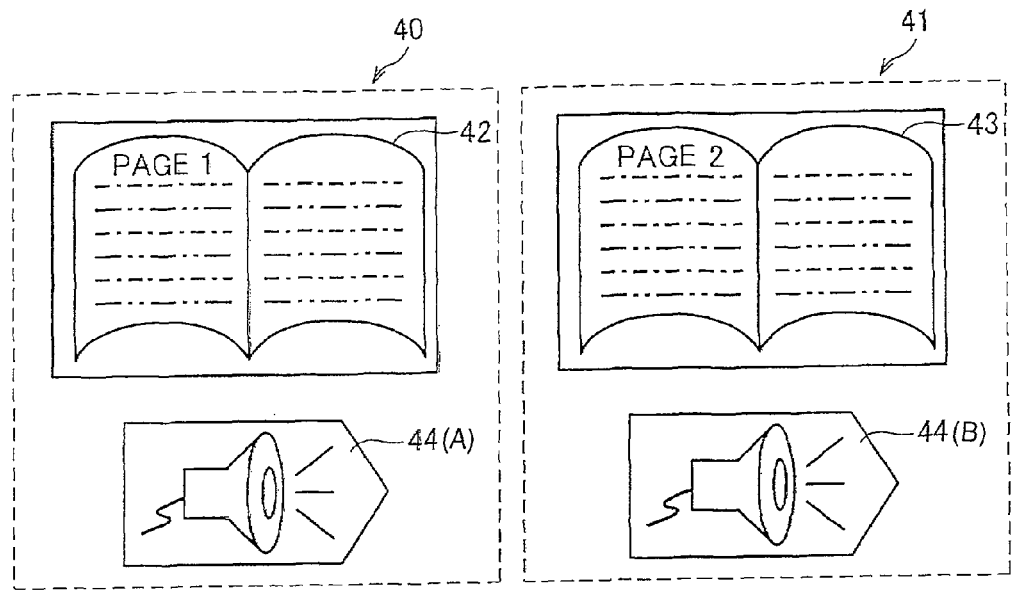
FIG. 4(a) is a diagram illustrating how page data and audio data are associated with each other, and how page data to be outputted next and the audio data are associated with each other.
FIG. 4(b) is an explanatory diagram illustrating that BGM is played back continuously when a display image is switched from one page image to another page image.
Figure 4:
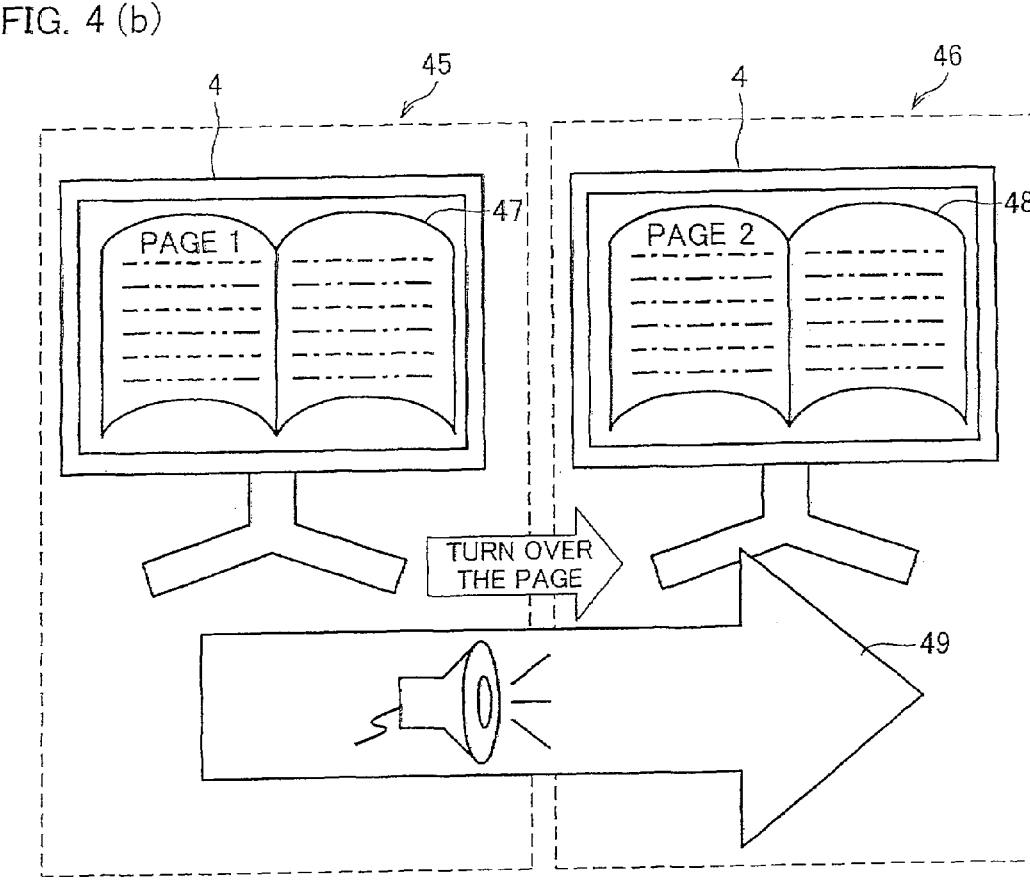

With reference to FIG. 4, the following explains respective examples of (i) the electronic data to be sent from the data outputting section 1 to the display device 4, and (ii) the audio data associated with the electronic data. Each of FIG. 4 is a diagram illustrating an example of control over outputting of the electronic data and the audio data. Specifically, FIG. 4(a) shows that page data 42 and BGM data 44(A) are associated with each other, and that page data 43 and the BGM data 44(B) are associated with each other. On the other hand, FIG. 4(b) shows that BGM 49 is continuously played back even when switching display images from a page image 47 to a page image 48.

The content database 15 stores, in advance, electronic book data 40 and electronic book data 41 each shown in FIG. 4(a). As shown in FIG. 4(a), the electronic book data 40 contains the page data 42 (electronic data) and the BGM data 44(A). In other words, the page data 42 and the BGM data 44(A) are associated with each other. Meanwhile, the electronic book data 41 contains the page data 43 (electronic data) and the BGM data 44(B). In other words, the page data 43 and the BGM data 44(B) are associated with each other.

In the data outputting device 1, the electronic data outputting section 10 sends the page data 42 to the display device 4. Further, the audio data outputting section 12 sends the BGM data 44(A) to the audio playback device 6. With this, as shown in an output state 45 of FIG. 4(b), the display device 4 displays on its screen the page image 47 represented by the page data 42, and the audio playback device 6 plays back the BGM 49 represented by the BGM data 44(A). This allows the user to view the page image 47 while listening to the BGM 49.

Now, consider a case where the user makes an instruction on this occasion so as to switch the display of the electronic book to the next page. In response to the instruction, the electronic data outputting section 10 switches the output electronic data from the page data 42 to the page data 43. In contrast, the audio data outputting section 12 does not switch the output audio data because the sameness judging section 11 judges on this occasion that the BGM data 44(A) associated with the page data 42 is identical to the BGM data 44(B) associated with the page data 43. In accordance with the judgment, the audio data outputting section 12 keeps on outputting the BGM data 44(A), which is currently being outputted. Therefore, even when the switching is made from the page image 47 to the page image 48 in the display device 4 as shown in an output state 46 of FIG. 4(b), the audio playback device 6 never stops playing back the BGM 49 and keeps on playing it back.

With the above process, the BGM 49, which is supposed to be played back continuously, is never temporarily stopped and keeps on being played back even upon the page image switching. Accordingly, the user never feels strange about the BGM 49 that he/she hears upon the page image switching. In other words, the user views the page images more comfortably (naturally).

(Data Outputting Process)

Figure 5:
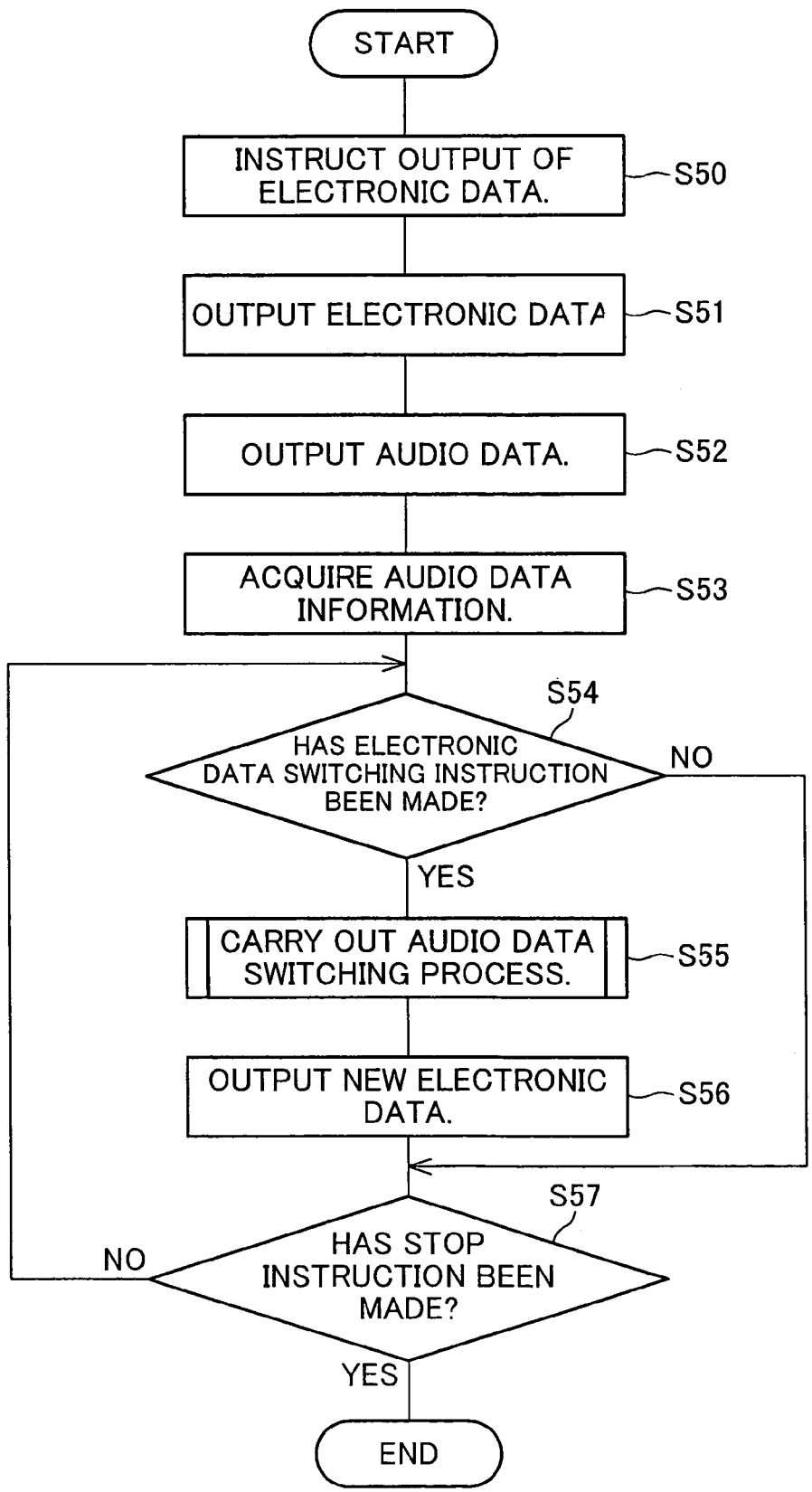
FIG. 5 is a flowchart illustrating one example of a flow of a process in which the data outputting device outputs electronic data and audio data.
Figure 6:
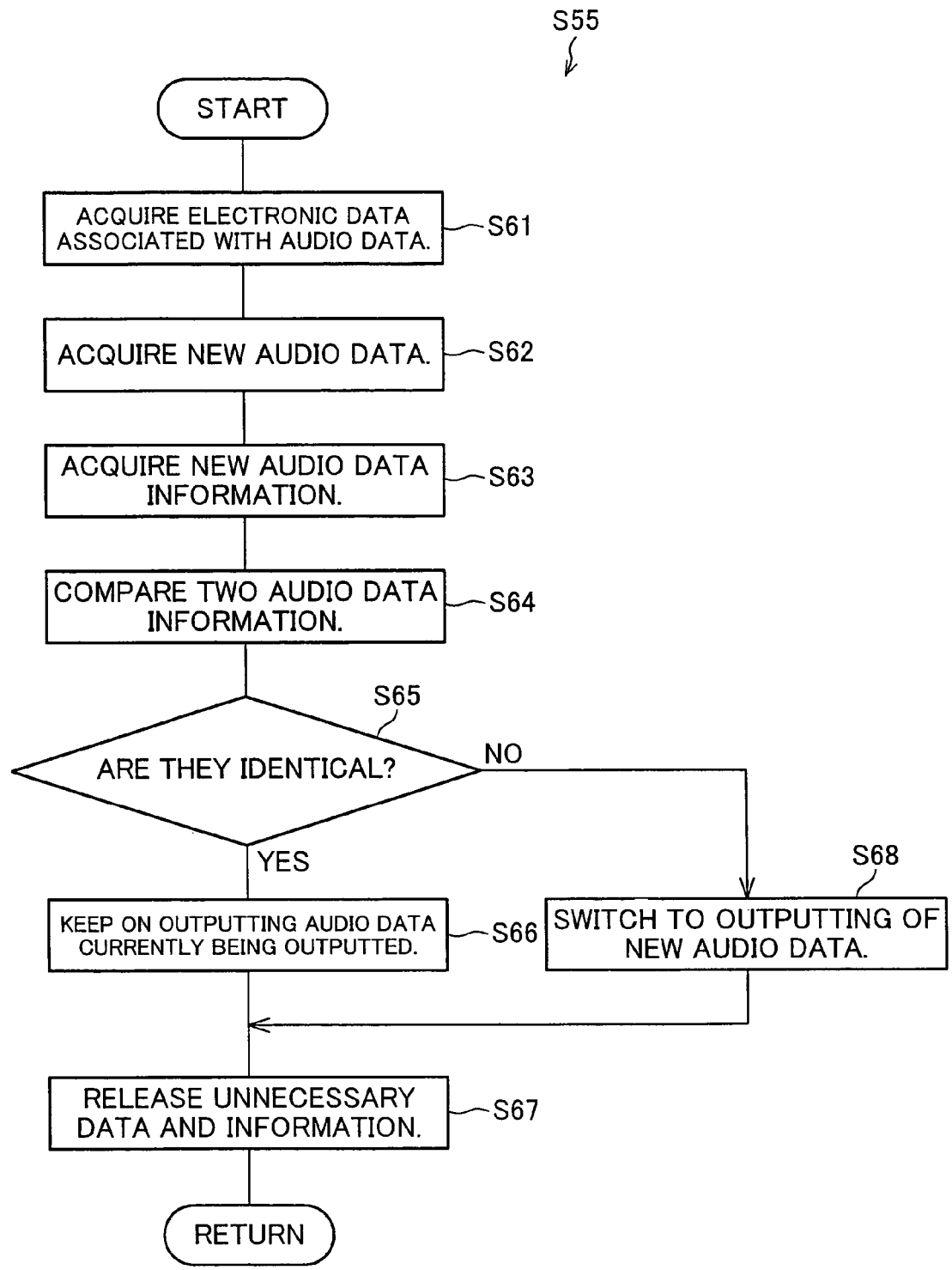
FIG. 6 is a flowchart illustrating a flow of an audio data switching process.

The following explains the above data outputting process more in detail, with reference to FIG. 5 and FIG. 6. FIG. 5 is a flowchart illustrating one example of a flow of the process in which the data outputting device 1 outputs electronic data and audio data. The process shown in FIG. 5 is carried out in such a manner that the CPU 30 of the data outputting device 1 of the present embodiment reads out and executes a program stored in the main storage device 31, the external storage device 32, or the like, so as to control the respective devices shown in FIG. 3.

As shown in FIG. 5, the client inputs an electronic data outputting instruction via the operation instruction inputting device 2. In response to the inputting, the operation instruction inputting device 2 sends the electronic data outputting instruction to the operation instruction processing section 13 (Step S50). In response to this instruction, the data acquiring section 14 makes connections to the content database 15 so as to acquire electronic data, and sends the acquired electronic data to the electronic data outputting section 10. Further, from the content database 15, the data acquiring section 14 acquires audio data associated with the acquired electronic data. Then, the data acquiring section 14 sends the acquired audio data to the audio data outputting section 12.

The electronic data outputting section 10 receives the electronic data, and sends the electronic data to the display device 4 (Step S51). Meanwhile, the audio data outputting section 12 receives the audio data, and sends the audio data to the audio playback device 6 (Step S52). On this occasion, the audio data outputting section 12 acquires audio data information from the received audio data, and sends the audio data information to the sameness judging section 11 (Step S53).

The audio data information extracted by the audio data outputting section 12 may indicate a filename that the audio data uses in the data outputting device 1, or may indicate a data amount of the audio data. Alternatively, the audio data information may indicate a playback time of the sound represented by the audio data, or may be an identifier provided in the audio data in advance so as to identify the audio data. Note that the audio data information may constitute a part of the audio data or the entire audio data.

With the above process, the data outputting device 1 outputs (i) the electronic data designated by the user at the beginning, and (ii) the audio data.

Next, the operation instruction processing section 13 judges whether or not the user has inputted an electronic data switching instruction (Step S54). When a result of the judgment is "True" (Yes), the data outputting device 1 carries out an audio data switching process (Step S55). Details about this process will be described later. Further, the electronic data outputting section 10 acquires and outputs new electronic data (Step S56). In this way, the electronic data outputting section 10 carries out switching of the outputting of the audio data.

On the other hand, when the result of the judgment is "False" (No) in Step S54, the operation instruction processing section 13 judges whether or not the client has inputted a stop instruction via the operation instruction inputting device 2 (Step S57). When a result of the judgment is "False" (No), the sequence goes back to Step S54, and the operation instruction processing section 13 judges whether or not the client has inputted the electronic data switching instruction (Step S54). In other words, the data outputting device 1 repeats the process from Step S54 to Step 57 until the client inputs the stop instruction.

Meanwhile, when the result of the judgment is "True" (Yes) in Step S57, the process shown in FIG. 5 is terminated. Specifically, the electronic data outputting section 10 stops outputting the electronic data, and the audio data outputting section 12 stops outputting the audio data. In this way, the data outputting device 1 finishes the outputting process of the content data. Accordingly, the display device 4 stops the image displaying, and the audio playback device 6 stops the sound playback.

(Audio Data Switching Process)

With reference to FIG. 6, the following explains the audio data switching process carried out in Step S55 by the data outputting device 1. FIG. 6 is a flowchart illustrating a flow of the audio data switching process. The process shown in FIG. 6 is carried out in such a manner that the CPU 30 of the data outputting device 1 reads out a program stored in the main storage device 31, the external storage device 32, or the like, so as to control the respective devices shown in FIG. 3.

As shown in FIG. 6, in cases where the operation instruction processing section 13 has received in Step S54 the audio data switching instruction entered by the client via the operation instruction inputting device 2, the data acquiring section 14 acquires, from the content database 15, the new electronic data which is be displayed instead of the electronic data that is currently being outputted (Step S61). Further, the data acquiring section 14 acquires the audio data associated with the new electronic data (Step S62).

The data acquiring section 14 sends the acquired new electronic data to the electronic data outputting section 10, and sends the acquired audio data to the audio data outputting section 12.

The audio data outputting section 12 receives the audio data, extracts the audio data information therefrom, and sends the extracted audio data information to the sameness judging section 11. That is, the sameness judging section 11 acquires the audio data information concerning the audio data that has been newly acquired by the data acquiring section 14 (Step S63).

The sameness judging section 11 has the audio data information concerning the audio data (current audio data) that is currently being outputted by the audio data outputting section 12. The sameness judging section 11 compares (i) the audio data information of the current audio data with (ii) the audio data information, acquired in Step S63, of the new audio data (Step S64). In accordance with the comparison, the sameness judging section 11 judges whether or not the audio information of the current audio data is identical to the audio data information of the new audio data (Step S65).

Specifically, the sameness judging section 11 judges that the current audio data and the new audio data are identical to each other, in cases where the filename of the current audio data is identical to the filename of the new audio data. The sameness judging section 11 also judges so in the following cases (1) through (4): (1) a case where the current audio data and the new audio data have the same data amount; (2) a case where the playback time of the current audio data and the playback time of the new audio data are identical to each other; (3) a case where the identifier that identifies the current audio data, and the identifier that identifies the new audio data are identical to each other; and (4) a case where the current audio data and the new audio data exactly coincide with each other.

(Continuation of Audio Data Outputting)

When the judgment result in Step S65 is "True" (YES), the sameness judging section 11 judges that the audio data that the audio data outputting section 12 is currently outputting, and the audio data that the audio data outputting section 12 has newly received are identical to each other. Therefore, the sameness judging section 11 instructs the audio data outputting section 12 to keep on outputting the audio data that is currently being outputted. In accordance with the instruction, the audio data outputting section 12 keeps on outputting the audio data that is being currently outputted (Step S66).

The new audio data that has been received by the audio data outputting section 12 is not necessary anymore. Therefore, the audio data outputting section 12 releases the unnecessary audio data from the memory (Step S67). Further, the new audio data information that has been received by the sameness judging section 11 is not necessary anymore, either. Therefore, the sameness judging section 11 releases the unnecessary audio data information from the memory (Step S67).

(Output Audio Data Switching)

Meanwhile, when the judgment result in Step S65 is "False" (No), the sameness judging section 11 instructs the audio data outputting section 12 to end the outputting of the audio data that is currently being outputted, and to output the audio data that has been newly acquired in Step S62. In accordance with the instruction, the audio data outputting section 12 ends the outputting of the audio data that is currently being outputted, and then outputs the audio data that has been received in Step S62. In other words, the audio data outputting section 12 switches the output audio data from the current one to the new one (Step S68).

The old audio data that the audio data outputting section 12 had been outputted is not necessary anymore. Therefore, the audio data outputting section 12 releases the unnecessary old audio data from the memory (Step S67). Further, the old audio data information that the sameness judging section 11 has is not necessary anymore, either. Therefore, the sameness judging section 11 releases the unnecessary old audio data information from the memory (Step S67).

After Step S67, the sequence goes to Step S56 shown in FIG. 5. In other words, the electronic outputting section 10 sends, to the display device 4, the electronic data that instructed to be outputted instead of the old audio data.

(Example of Image Display and Audio Playback)

Figure 7:
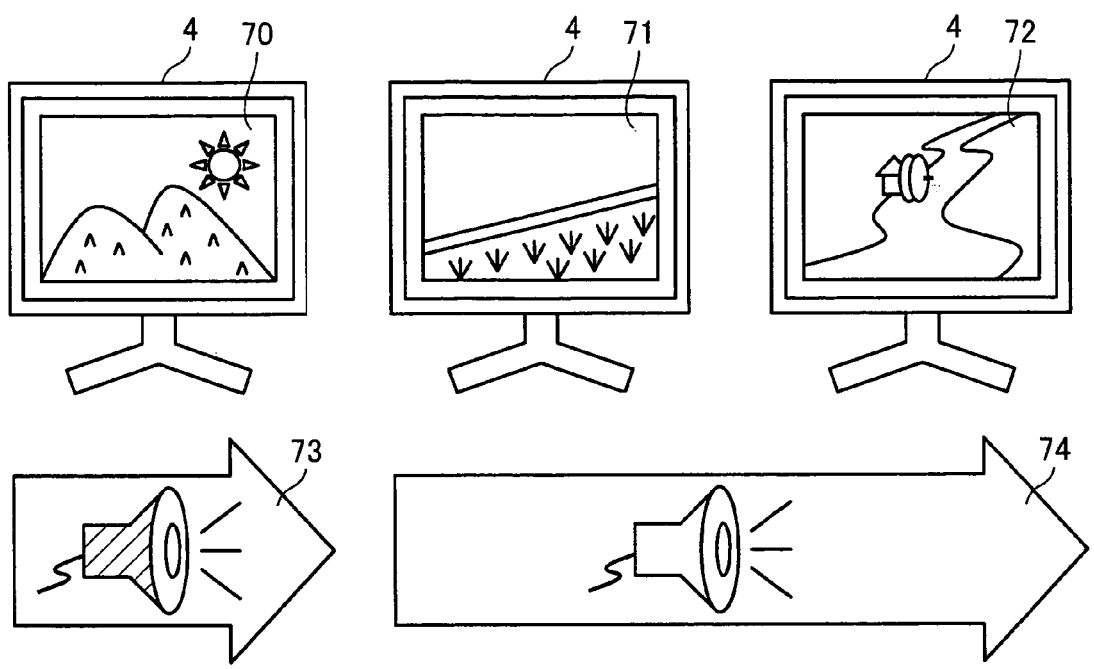
FIG. 7 is a diagram illustrating display of a still image and playback of BGM corresponding to the still image.

By carrying out the above process, the playback images can be switched from one to another but the same sound can be kept on being played back, as shown in FIG. 7. With reference to FIG. 7, the following explains a case where electronic data representing photos and landscape paintings are associated with audio data representing BGM. FIG. 7 is a diagram illustrating how the landscape paintings are displayed and how the BGM corresponding to the landscape paintings are played back.

The length of time of viewing each of such displayed still images, i.e., the photos and the landscape paintings is likely to differ depending on a user who views them. Consider a case where a user views each of the displayed images for a short period of time, and where each of the conventional techniques is adopted. In this case, the BGM is stopped and is played back again many times during a short period of time, with the result that there is obtained substantially no effect as BGM.

However, the effect as BGM can be exhibited by the data outputting device 1, which is according to the present embodiment and which sends the electronic data to the display device 4 and sends the audio data to the audio playback device 6. This will be explained as follows.

In the example shown in FIG. 7, electronic data representing an image 70 is associated with audio data representing BGM 73. On the other hand, electronic data representing an image 71 and electronic data representing an image 72 are associated with the same audio data representing BGM 74. The BGM 73 and the BGM 74 are different sounds. Therefore, the audio data representing the BGM 73 and the audio data representing the BGM 74 are different data.

While the display device 4 displays the image 70 as shown in FIG. 7, the audio playback device 6 plays back the BGM 73. When the user instructs the data outputting device 1 to cause the image 71 to be displayed, the display device 4 switches the display images from the image 70 to the image 71. Here, the electronic data representing the image 71 is associated with the audio data representing the BGM 74, and the audio data representing the BGM 74 and the audio data representing the BGM 73 are different audio data as described above. Therefore, the audio playback device 6 stops the playback of the BGM 73, and plays back the BGM 74. In other words, the audio playback device 6 switches the playback sounds from the BGM 73 to the BGM 74.

The BGM 73 and the BGM 74 are different sounds, so that the user never feels strange even when there is brief silence upon the switching from the BGM 73 to the BGM 74.

Further, when the user inputs a display image switching instruction on this occasion, the display device 4 switches the display images from the image 71 to the image 72. The electronic data representing the image 71, and the electronic data representing 72 are associated with the same audio data representing the BGM 74. Therefore, the audio playback device 6 never stops playing back the BGM 74 and keeps on playing it back.

In this way, the playback of the same BGM is never unnaturally stopped temporarily and restarted when the user switches viewing target images from one to another. This prevents the user from feeling strange, and allows him/her to concentrate on viewing the images.

(Conclusion)

As described above, the data outputting device 1 includes the sameness judging section 11, unlike the conventional techniques. This allows realization of such an asynchronous operation that "playback of audio data that is being currently played back is never stopped when electronic data that is currently being displayed is shifted to a different point". In other words, this makes it possible to carry out grouped processing by merely carry out setting based on a minimum unit of data. As a result, load imposed on a content creator can be reduced, and a client never experiences unnatural intermittence in audio playback when viewing a product content, unlike the conventional techniques in which audio playback is unnaturally intermitted upon switching electronic data from one to another.

Embodiment 2

Figure 8:
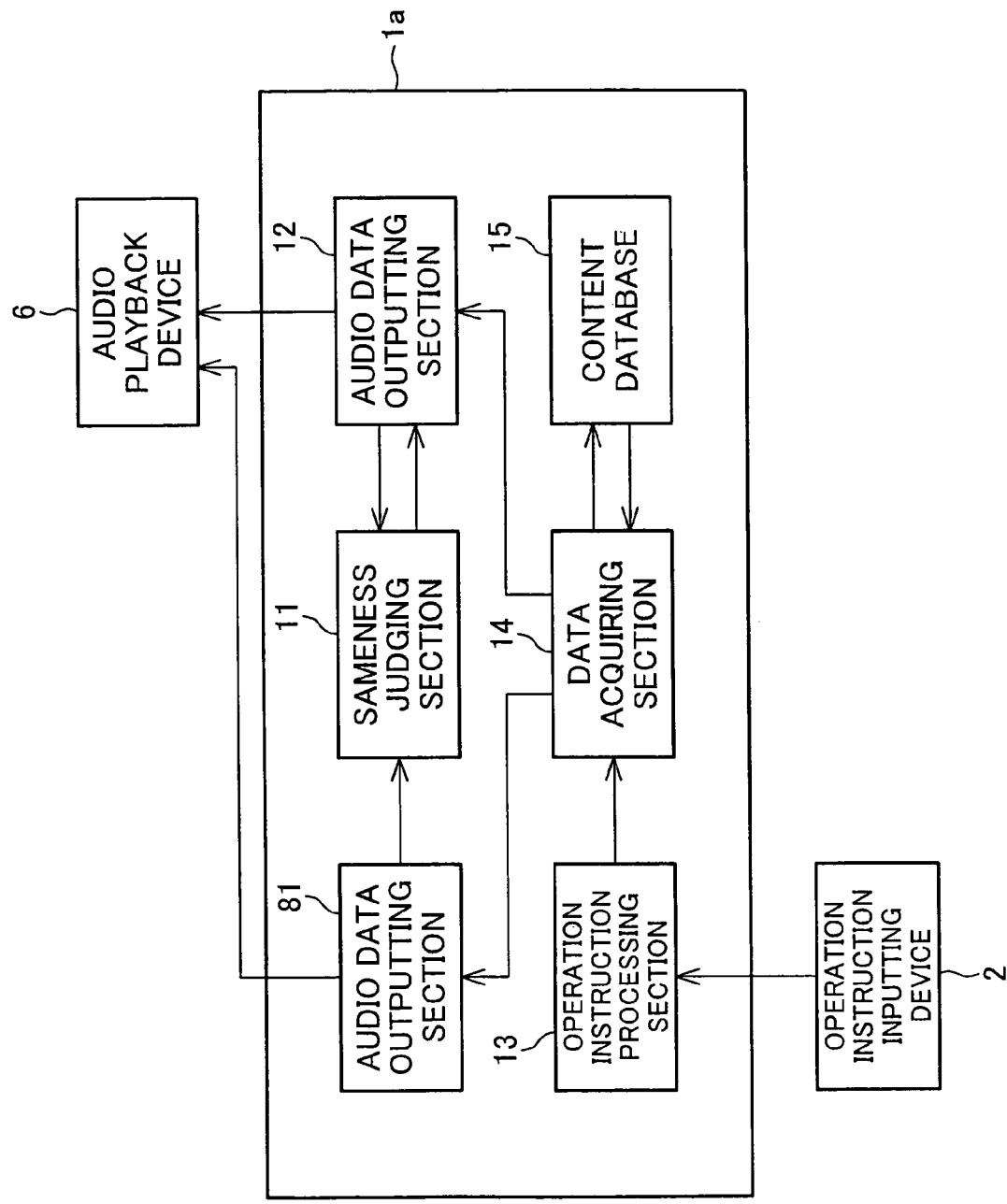
FIG. 8 is a block diagram illustrating a structure of a main part of a data outputting device.
Figure 9:
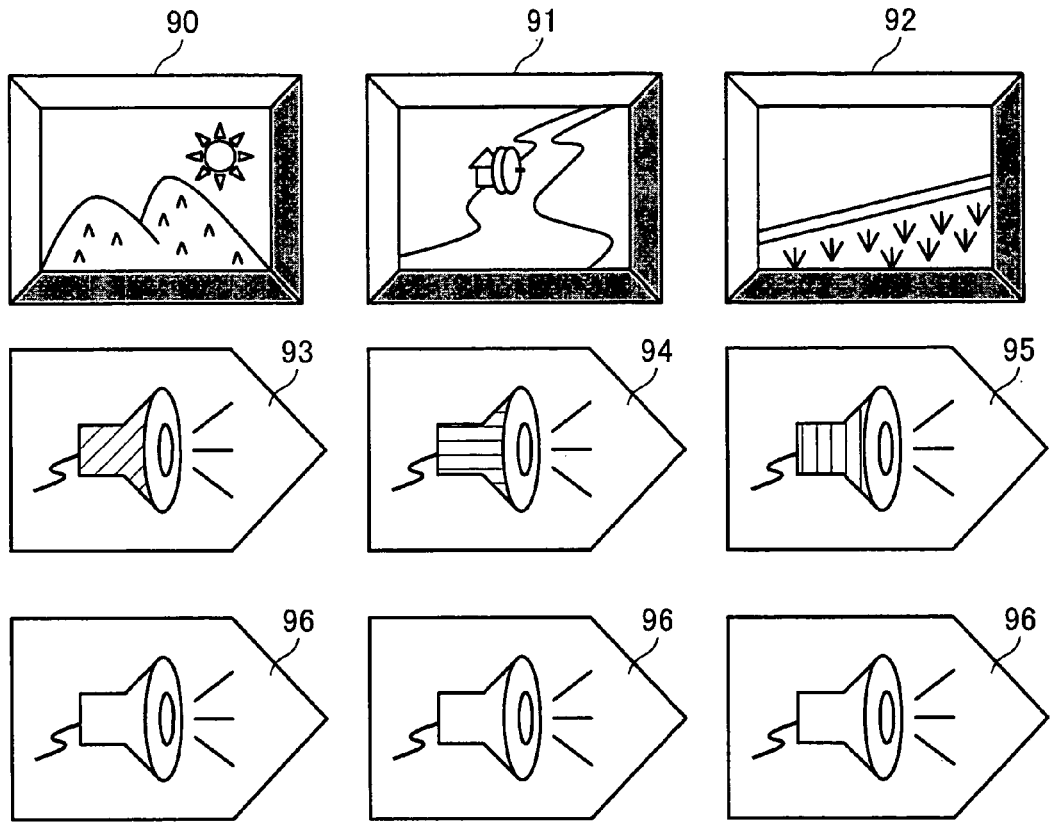
FIG. 9(*a*) is a diagram illustrating association among (i) paintings, (ii) audio data for explanation of the paintings and (iii) BGM.
Figure 9:
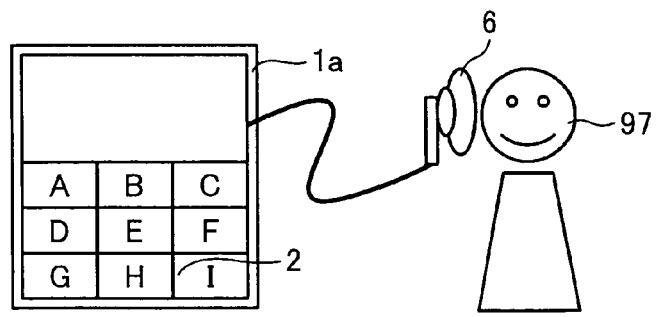
Figure 10:
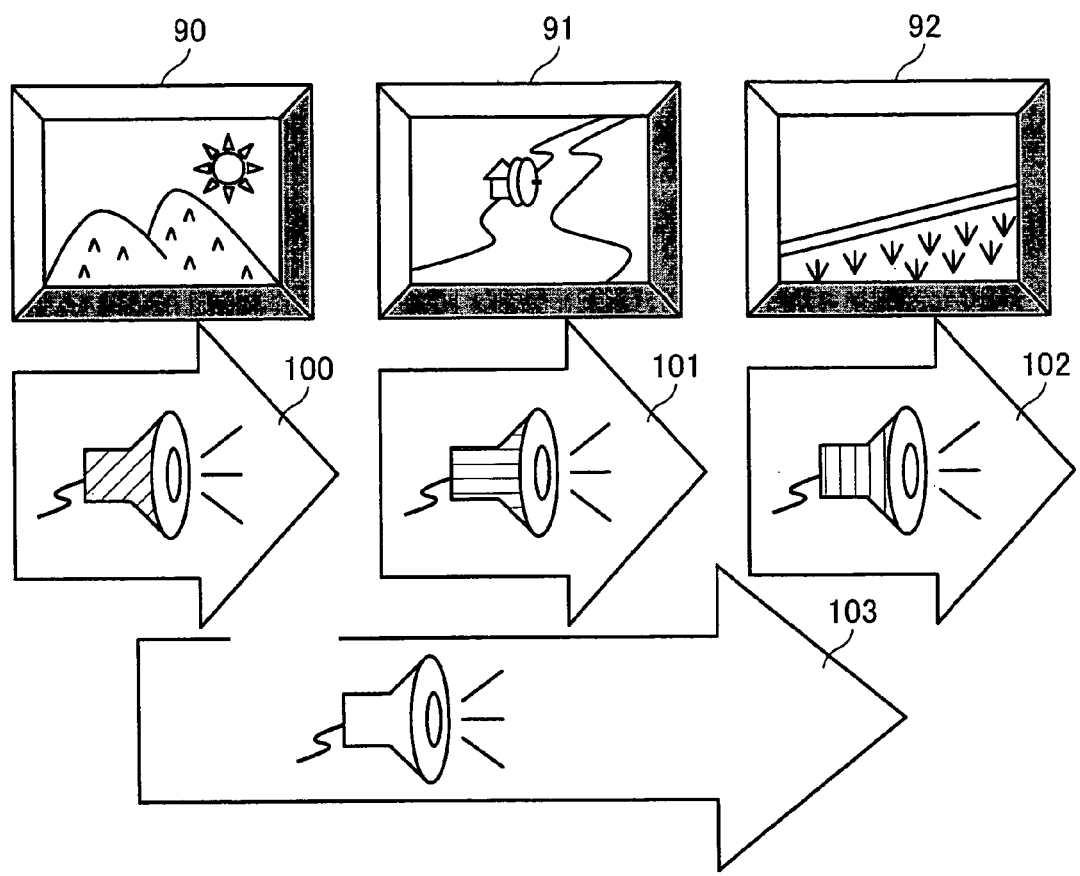
FIG. 10 is a diagram illustrating a relation among paintings, playback of voice explanations, and playback of BGM.
Figure 11:
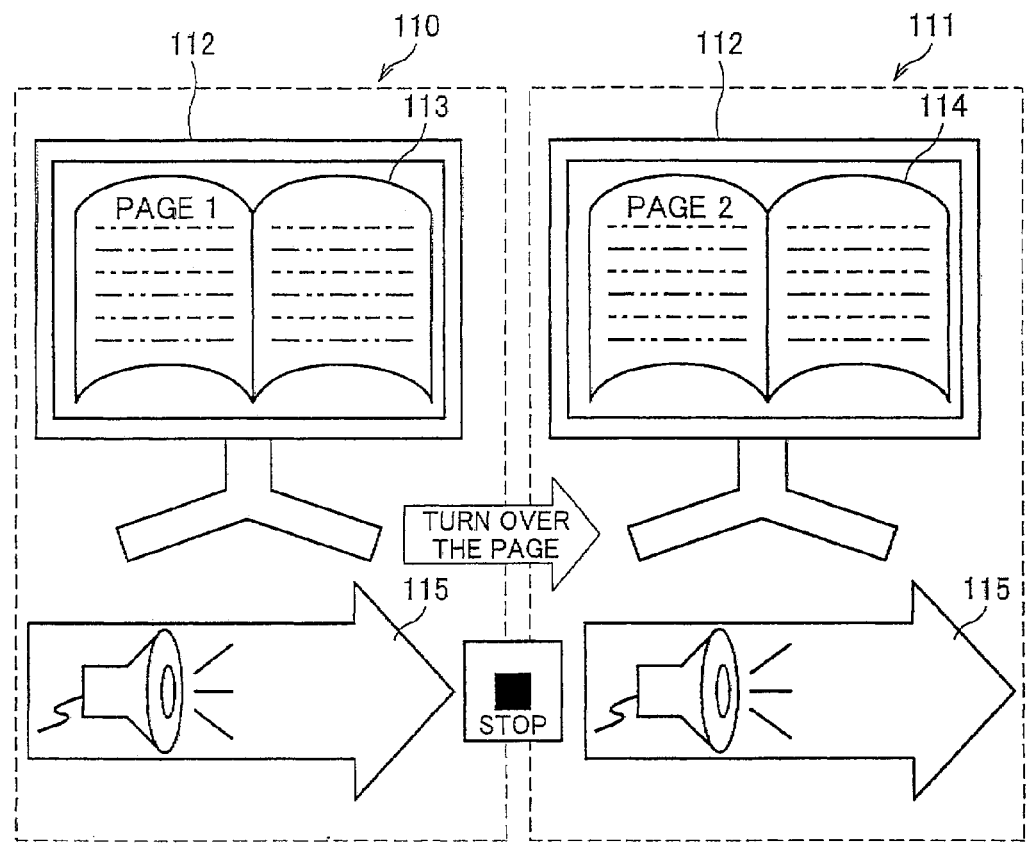
FIG. 11 is an explanatory diagram illustrating how BGM is discontinuously played back in a conventional technique.

With reference to FIG. 8 through FIG. 10, the following explains a data outputting device 1a, which is a modified example of the data outputting device 1. As to structures and functions equivalent to those of the data outputting device 1, see Embodiment 1.

(Modified Example of the Data Outputting Device 1)

As described above, the data outputting device 1 is so arranged as to send, to the display device 4, electronic data representing an image or a moving image, and as to send, to the audio playback device 6, audio data representing a sound. The data outputting device 1 thus arranged is suitable in the case of outputting content data obtained by combining visually recognizable information with auditorily recognizable information.

However, the present invention is not limited to the data outputting device 1 arranged as above. That is, the present invention is applicable to a structure which simultaneously outputs (i) audio data supposed to be discontinuously switched from one to another, and (ii) audio data supposed to be played back continuously. The following explains the data outputting device 1a having such a structure, with reference to FIG. 8.

(Data Outputting Device 1a)

FIG. 8 is a block diagram illustrating a structure of a main part of the data outputting device 1a. As shown in FIG. 8, the data outputting device 1a includes: a sameness judging section 11 (sameness judging means), an audio data outputting section 12 (audio data outputting means), an operation instruction processing section 13, a data acquiring section 14, a content database 15, and an audio data outputting section 81 (electronic data outputting means). Further, the data outputting device 1a is connected to the operation instruction inputting device 2 and the audio playback device 6.

Here, the audio data outputting section 81 sends audio data to the audio playback device 6. However, the audio data outputting section 81 never sends, to the sameness judging section 11, audio data information concerning the audio data to be sent to the audio playback device 6. Specifically, the audio data to be sent from the audio data outputting section 81 is never subjected to the judgment for the sameness between the audio data and other audio data, between which the switching is to be made. In other words, when the audio data outputting section 81 receives new audio data, the audio data outputting section 81 sends the new audio data as it is. This is because audio data supplied to the audio data outputting section 81 are data respectively representing sounds supposed to be switched from one to another discontinuously.

(Audio Playback by the Data Outputting Device 1a)

The data outputting device 1a is so arranged as to output two different sounds at the same time as such. Therefore, the data outputting device 1a is suitably applicable to a system for playing back voice explanations for exhibits in a gallery or a museum while playing back BGM. The BGM thus played back makes a viewer feel relaxed, whereas the voice explanations allow the viewer to deepen his/her understanding of the exhibits.

FIG. 9(*a*) is a diagram illustrating association among paintings, audio data for explaining the paintings, and association between the audio data and BGM. Specifically, FIG. 9(*a*) shows that paintings 90, 91, and 92 are exhibited in a gallery for the sake of user's viewing. Assume that the content database 15 of the data outputting device 1a stores voice explanation data 93 for explaining the painting 90, voice explanation data 94 for explaining the painting 91, and voice explanation data 95 for explaining the painting 92.

The voice explanation data 93, 94, and 95 are associated with the same BGM data 96 in the content database 15.

FIG. 9(*b*) is a diagram illustrating a case where a viewer 97 is viewing the paintings while listening to the voice explanations and the BGM with the use of the data outputting device 1a. As shown in FIG. 9(*b*), while viewing an exhibited painting, the viewer 97 operates the operation instruction input device 2 provided in one piece with the data outputting device 1a so as to select a voice explanation to which he/she would like to listen. With this, via the audio playback device 6 serving as a headphone, the viewer 97 can simultaneously listen to (i) the voice explanation represented by the voice explanation data, and (ii) BGM represented by the BGM data associated with the voice explanation data.

FIG. 10 is a diagram illustrating a relation among (i) the paintings, (ii) playback of the respective voice explanations for the paintings, and (iii) playback of the BGM. A voice explanation 100 is a sound (voice) represented by the voice explanation data 93, a voice explanation 101 is a sound (voice) represented by the voice explanation data 94, a voice explanation 102 is a sound (voice) represented by the voice explanation data 95, and BGM 103 is a sound represented by the BGM data 96.

Now, think that the viewer 97 is viewing the painting 90 while listening to the voice explanation 100 concerning the painting 90 via the audio playback device 6. On this occasion, the audio playback device 6 is simultaneously playing back the voice explanation 100 and the BGM 103. Then, the viewer stops viewing the painting 90, and starts viewing the painting 91. On this occasion, via the operation instruction device 2, the viewer 97 instructs the data outputting device 1a to play back the voice explanation 101 concerning the painting 91.

In response to the instruction, the audio data outputting section 81 of the data outputting device 1a stops outputting the voice explanation data 93, and outputs the voice explanation data 94. This allows the viewer to listen to the voice explanation 101 via the audio playback device 6.

Further, the sameness judging section 11 judges that the BGM data 96 associated with the voice explanation data 93 and the BGM data 96 associated with the voice explanation data 94 are identical to each other. Therefore, the audio data outputting section 12 does not stop outputting the BGM data 96 but keeps on outputting it. Thus, even when the switching is made from the voice explanation 100 to the voice explanation 101, the BGM 103 is kept on being played back from the audio playback device 6. This allows the viewer to continuously listen to the BGM 103 even upon the switching of the voice explanations, so that the viewer never feels strange.

Next, the viewer 97 instructs the data outputting device 1a to carry out switching from (i) the voice explanation 101 concerning the painting 91 to (ii) the voice explanation 102 concerning the painting 92. The BGM data 96 that the audio data outputting section 12 is currently outputting is the same as the BGM data 96 that has been newly sent to the audio data outputting section 12 and that is associated with the voice explanation 102. Therefore, the audio data outputting section 12 keeps on outputting the BGM data 96 that is currently being outputted. In this way, the audio playback device 6 plays back the voice explanation 102 concerning the painting 92, and keeps on playing back the BGM 103 even upon the switching to the voice explanation 102.

(Conclusion)

The use of the above system allows the viewer 97 to listen, at an arbitrary timing, to a voice explanation concerning an exhibit that he/she is currently viewing. Also in this case, speed of viewing the exhibit differs depending on a viewer. Further, the viewer 97 possibly does not fully listen to the explanation. Therefore, the length of the voice explanation to be played back differs quite irregularly.

Therefore, in cases where information such as BGM is superimposed on such audio information in the conventional system by merely recording the BGM and the audio information simultaneously, the BGM is intermittently interrupted, with the result that an intrinsic effect as BGM cannot be obtained. However, a gallery or a museum actually adopts BGM, so that there is significance in applying the data outputting device 1a according to the present embodiment to a specification in which an explanation is played back together with BGM.

Note that the data outputting device 1a is not limited to such a structure that the voice explanation data and the BGM data are outputted together from one audio playback device 6. For example, the data outputting device 1a may be arranged such that: the audio data outputting section 12 sends the BGM data to the audio playback device 6, whereas the audio data outputting section 81 sends the voice explanation data to another audio playback device different from the audio playback device 6. In this case, the audio playback device 6 and the other one are disposed in the same place, and respectively plays back the sounds, with the result that the voice explanation and the BGM are played back together. In this way, the two different sounds are played back by the audio playback devices, individually but simultaneously. This renders the audio playback more impressive as compared with the case where the two sounds are played back from one device simultaneously.

(Use of Digital Data)

Note that, in the data outputting device 1a, audio data outputted by the audio data outputting section 12, and audio data outputted by the audio data outputting section 81 may be digital data. For example, the data outputting device 1a sends both digital voice explanation data and digital BGM data to the audio playback device 6. The audio playback device 6 used in this case may be any device that is capable of playing back sounds respectively represented by the digital data. For example, the audio playback device 6 may be a device including an amplifier, which is capable of processing the digital audio data and of generating an analog signal to be sent to a speaker.

Further, the audio data outputting section 12 may combine the voice explanation data with the BGM data so as to generate one combined audio data, and may send the generated combined audio data to the audio playback device 6. In this case, instead of sending data obtained by completely combining the two data, the audio data outputting section 12 may sequentially output combined parts of the data during the combining. When the combining of the voice explanation data with the BGM data is completed up to the end, the audio data outputting section 12 may stop the combining and only output the BGM data from then on.

In the above structure, the sameness judging section 11 notifies the audio data outputting section 12 of (i) the switching in the voice explanation data outputting, and (ii) the instruction for continuous outputting of the BGM data. When the audio data outputting section 12 is thus notified, the audio data outputting section 12 stops combining the voice explanation data currently being combined; however, the audio data outputting section 12 keeps on outputting only the BGM data. In other words, the combining is temporarily stopped, but the outputting of the BGM data does not stop and continues. The next voice explanation data, to which the switching is instructed to be made, starts to be combined with the BGM data from its beginning in the same manner as previously mentioned, and combined parts are sequentially outputted.

With the above process, the combining process of the voice explanation data and the BGM data, and the outputting of the combined audio data thus obtained are never interrupted at a timing at which the switching of the voice explanations is made. With this, the BGM supposed to be played back continuously are played back without any interruption, so that the viewer never feels strange about the sounds while viewing the paintings and listening to the voice explanations and the BGM. In conclusion, even when the data outputting device 1a sends such higher quality digital audio data to the audio playback device 6, the sound supposed to be continuously played back is never interrupted at the timing at which the voice explanations, which are highly likely to be switched from one to another discontinuously, are switched from one to another.

(Program and Recording Medium)

Finally, the respective blocks provided in the data outputting devices 1 may be constituted by hardware logic, or may be realized by a software with the use of a CPU (Central Processing Unit) as follows.

That is, the data outputting device 1 includes: (i) a CPU for executing an instruction of a control program realizing each function; (ii) a ROM (read only memory) for storing the program; (iii) a RAM (random access memory) for expanding the program in such a format that the program can be executed; (iv) a memory device (recording medium) such as a memory for storing the program and various types of data; and the like.

With such a structure, the object of the present invention is achieved by a predetermined recording medium provided in the data outputting device 1 and storing a computer-readable program code (executable program, intermediate code program, a source program) of the program for controlling the data outputting device 1. The control program is software for realizing the function. A computer (or CPU, MPU (micro processing unit)) reads out and executes the program code stored in the recording medium.

The recording medium for supplying the program code to the data outputting device 1 is not limited to a recording medium having a specific structure or a specific type of recording medium. Examples of the recording medium include: tapes such as a magnetic tape and a cassette tape; magnetic disks such as a Floppy® disk and a hard disk; optical disks such as a CD-ROM (compact disk read only memory), a magnetic optical disk (MO), a mini disk (MD), a digital video disk (DVD), and a CD-R (CD-Rewritable); and the like. Further, the recording medium may be: a card such as an IC card (inclusive of a memory card) and an optical card; or a semiconductor memory such as a mask ROM, an EPROM (electrically programmable read only memory), an EEPROM (electrically erasable programmable read only memory), or a flash ROM.

Further, the object of the present invention can be achieved by arranging the data outputting device 1 such that the data outputting device 1 is connectable to a communication network. In this case, the program code is supplied to the data outputting device 1 via the communication network. The communication network is not limited to a specific type or form of network, but may be any communication network as long as the program code can be supplied to the data outputting device 1 via the communication network. Specific examples thereof are: the Internet, intranet, extranet, LAN (local area network), ISDN (integrated services digital network), VAN (value added network), CATV (cable TV) communication network, virtual private network, telephone network, mobile communication network, satellite communication network, and the like.

Further, a transmission medium constituting the communication network is not limited to a transmission medium having a specific structure or a specific type of transmission medium, but may be any medium allowing transmission of the program code. Specific examples thereof include: (i) a wired line using the IEEE (Institute of Electrical and Electronics Engineers) 1394, a USB (universal serial bus), a power-line communication, a cable TV line, a telephone line, an ADSL line, or the like; or (ii) a wireless line using IrDA, infrared rays used for a remote controller, Bluetooth®, IEEE 802.11, HDR (High Data Rate), a mobile phone network, a satellite connection, a terrestrial digital network, or the like. Note that the present invention can be realized by either a carrier wave or a data signal row, each of which represents the aforesaid program code and each of which is electrically transmitted.

The above description concerning the program and the recording medium also holds true for the data outputting device 1a.

The present invention is not limited to the description of the embodiments above, but may be altered by a skilled person within the scope of the claims. An embodiment based on a proper combination of technical means disclosed in different embodiments is encompassed in the technical scope of the present invention.

Further, it is preferable to arrange the data outputting device according to the present invention such that: the sameness judging means judges that the audio data and the another audio data are identical to each other, when the audio data and the another audio data have an identical filename. Alternatively, it is preferable to arrange the data outputting device according to the present invention such that: the sameness judging means judges that the audio data and the another audio data are identical to each other, when the audio data and the another audio data have an identical data amount.

Further, it is preferable to arrange the data outputting device according to the present invention such that: the sameness judging means judges that the audio data and the another audio data are identical to each other, when the audio data and the another data have an identical playback time. Alternatively, it is preferable to arrange the data outputting device according to the present invention such that: the sameness judging means judges that the audio data and the another audio data are identical to each other, when an identifier included in the audio data so as to identify the audio data, and an identifier included in the another audio data so as to identify the another audio data are identical to each other.

With any of the above processes, the sameness judging means judges whether or not the audio data and the another audio data are identical to each other, more efficiently.

Further, the data outputting device according to the present invention may be arranged such that: the sameness judging means judges that the audio data and the another audio data are identical to each other, when audio data information acquired from the audio data, and another audio data information acquired from the another audio data are identical to each other.

Further, it is preferable to arrange the data outputting device according to the present invention such that: each of the electronic data and the another electronic data is electronic data that represents a sound and that is different from the audio data.

According to the structure, each of the electronic data and the another electronic data is electronic data representing a sound. For example, each of the electronic data and the another electronic data is electronic data representing a voice explanation for explaining a painting viewed by the user. In this case, the audio data serving as the electronic data is sent from the electronic data outputting means to the content playback device serving as the audio playback device. When the user instructs voice explanation switching, the data outputting device carries out switching of outputting of the voice explanation data but keeps on outputting the audio data such as the BGM.

Therefore, the data outputting device arranged as above is suitably usable in cases where switching of voice explanations is carried out for every painting in a gallery or the like while keeping on playing back the same BGM.

Further, the data outputting device according to the present invention may be arranged such that: the electronic data outputting means sends both the electronic data and the another electronic data, each of which represents the sound, to another audio playback device different from the audio playback device.

According to the above structure, the electronic data outputting means sends both the electronic data and the another electronic data, each of which represents the sound, to the another audio playback device different from the audio playback device to which the audio data outputting means sends the audio data. With this, two different sounds are played back together by the separate audio playback devices. This renders the audio playback more impressive as compared with a case where two sounds are simultaneously played back from one device.

Further, it is preferable to arrange the data outputting device such that: the content playback device is the audio playback device, the electronic data representing the sound, the another electronic data representing the sound, the audio data, and the another audio data are digital data, the electronic data outputting means and the audio data outputting means constitute one combined audio data outputting means, and when the sameness judging means judges, while the combined audio data outputting means generates combined audio data by combining the electronic data with the audio data and sends the combined audio data to the audio playback device, that the audio data and the another audio data are identical to each other, the combined audio data outputting means stops combining the electronic data with the audio data, keeps on outputting the audio data, generates another combined audio data by combining (i) the audio data kept to be outputted with (ii) the another electronic data to which the switching is instructed to be made, and sends the another combined audio data thus generated to the audio playback device.

According to the above structure, the data outputting device outputs e.g., digital voice explanation data and BGM audio data. In this case, the voice explanation data and the BGM data are combined with each other, and the data thus combined is outputted. Moreover, in the above structure, the voice explanation data and the BGM data are not merely combined but are combined such that switching of the voice explanation data can be carried out while outputting of the BGM audio data is never interrupted. With this, the BGM supposed to be played back continuously is played back without interruption, so that the viewer who is viewing a painting while listening to the voice explanation and the BGM does not feel strange about the sounds. In other words, even when the data outputting device sends higher sound quality digital audio data to the audio playback device, the BGM supposed to be played back continuously is never interrupted at a timing at which voice explanations that are likely to be switched discontinuously are switched from one to another.

Note that the data outputting device may be realized by a computer. In this case, the present invention encompasses (i) a data outputting program for realizing the data outputting device in the computer by causing the computer to operate as the aforementioned respective means, and (ii) a computer-readable recording medium storing the data outputting program.

The data outputting device according to the present invention operates as follows. That is, the data outputting section switches output electronic data from one electronic data to another electronic data. Upon the switching, the sameness judging section judges whether or not audio data associated with the electronic data and audio data associated with the new electronic data that is to be outputted are identical to each other. When the sameness judging section judges that they are identical to each other, the audio data outputting section keeps on outputting the audio data that is being currently outputted.

This makes it possible to prevent such unnatural audio playback that a sound supposed to be played back continuously is temporarily stopped upon the content playback switching and is played back again. This allows the user to keep on listening to the same sound (e.g., BGM) while the content switching is carried out from one to another. In other words, the data outputting device gives the user a sufficient effect (e.g., mood or sense of presence that the user feels as if he/she were really in a scene presented by the content) allowed by the sound associated with the content.

The present invention is widely applicable to various devices each for simultaneously outputting (i) electronic data representing a content and (ii) audio data associated with the electronic data.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A data outputting device, comprising:
   electronic data outputting means for sending, to a content playback device, electronic data representing a content;
   audio data outputting means for sending, to an audio playback device, audio data associated with said electronic data and representing a sound; and
   sameness judging means for judging, when the electronic data outputting means carries out switching from said electronic data to another electronic data different from said electronic data such that said another electronic data is to be sent to the content playback device, whether or not said audio data and another audio data associated with said another electronic data are identical to each other,
   when the sameness judging means judges that said audio data and said another audio data are identical to each other, the audio data outputting means keeping on sending said audio data to the audio playback device.

2. The data outputting device as set forth in claim 1, wherein:
   the sameness judging means judges that said audio data and said another audio data are identical to each other, when said audio data and said another audio data have an identical filename.

3. The data outputting device as set forth in claim 1, wherein:
   the sameness judging means judges that said audio data and said another audio data are identical to each other, when said audio data and said another audio data have an identical data amount.

4. The data outputting device as set forth in claim 1, wherein:
   the sameness judging means judges that said audio data and said another audio data are identical to each other, when said audio data and said another data have an identical playback time.

5. The data outputting device as set forth in claim 1, wherein:
   the sameness judging means judges that said audio data and said another audio data are identical to each other, when an identifier included in said audio data so as to identify said audio data, and an identifier included in said another audio data so as to identify said another audio data are identical to each other.

6. The data outputting device as set forth in claim 1, wherein:
   each of said electronic data and said another electronic data is electronic data that represents a sound and that is different from said audio data.

7. The data outputting device as set forth in claim 6, wherein:
the electronic data outputting means sends both said electronic data and said another electronic data, each of which represents the sound, to another audio playback device different from the audio playback device.

8. The data outputting device as set forth in claim 7, wherein:
the content playback device is the audio playback device,
said electronic data representing the sound, said another electronic data representing the sound, said audio data, and said another audio data are digital data,
the electronic data outputting means and the audio data outputting means constitute one combined audio data outputting means, and
when the sameness judging means judges, while the combined audio data outputting means generates combined audio data by combining said electronic data with said audio data and sends the combined audio data to the audio playback device, that said audio data and said another audio data are identical to each other, the combined audio data outputting means stops combining said electronic data with said audio data, keeps on outputting said audio data, generates another combined audio data by combining (i) said audio data kept to be outputted with (ii) said another electronic data to which the switching is instructed to be made, and sends said another combined audio data thus generated to the audio playback device.

9. The data outputting device as set forth in claim 1, wherein:
the sameness judging means judges that said audio data and said another audio data are identical to each other, when audio data information acquired from said audio data, and another audio data information acquired from said another audio data are identical to each other.

10. A data outputting method, comprising:
a first electronic data outputting step of sending electronic data representing a first content to a content playback device;
an audio data outputting step of sending audio data associated with said electronic data and representing a sound to an audio playback device at least while said electronic data representing said first content is being sent to said content playback device in said first electronic data outputting step;
an acquiring step of acquiring new electronic data representing a new content different from the first content and new audio data associated with said new electronic data;
a switching step of carrying out switching from said electronic data representing said first content to said new electronic data representing said new content different from said first content such that said new electronic data is then sent to the content playback device in a second electronic data outputting step;
a sameness judging step of judging whether or not said audio data being sent in said audio data outputting step and said new audio data acquired with the new electronic data are considered to be identical to each other; and
a continued audio data outputting step of continuing to send said audio data to the audio playback device when it is judged in the sameness judging step that the audio data and the new audio data are considered to be identical to each other.

11. A non-transitory computer-readable recording medium for storing a data outputting program for causing a computer to function as a data outputting device including: (a) electronic data outputting means for sending first electronic data representing a first content to a content playback device; (b) audio data outputting means for sending first audio data associated with said first electronic data and representing a sound to an audio playback device; (c) an operation instruction processing means for receiving an instruction from an operation instruction inputting means and acquiring new electronic data representing a new content different from said first content and new audio data representing a sound associated with said new content of said new electronic data based on said instruction; and sameness judging means for judging whether or not said first audio data and said new audio data associated with new electronic data having said new content different from said first content are considered to be identical to each other when the electronic data outputting means is switched to send the new electronic data in place of the first electronic data and when the sameness judging means judges that said first audio data and said new audio data are considered to be identical to each other, the sameness judging means causes the audio data outputting means to keep on sending said first audio data to the audio playback device.

* * * * *